L. C. Clark.
Tea-Pot.

N° 104,829.    Patented Jun. 28, 1870.

Witnesses:
H. B. Dodge
C. A. Shepard

Inventor:
Lucas C. Clark
By James Shepard
Atty

United States Patent Office.

LUCAS C. CLARK, OF PLANTSVILLE, CONNECTICUT.

Letters Patent No. 104,829, dated June 28, 1870.

IMPROVEMENT IN TEA-POT HANDLE.

The Schedule referred to in these Letters Patent and making part of the same

I, LUCAS C. CLARK, of Plantsville, in the county of Hartford and State of Connecticut, have invented certain new and useful Improvements in Tea-pot Handles, of which the following is specification.

The object of my invention is to provide a cheap and reliable connection for securing handles to tea-pots and similar vessels, as hereafter more fully described.

In the accompanying drawing—

Figure 1:
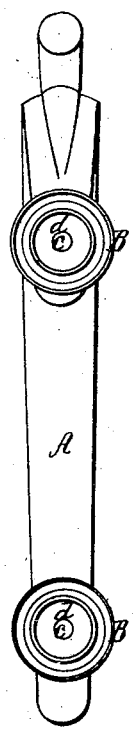
Figure 2:
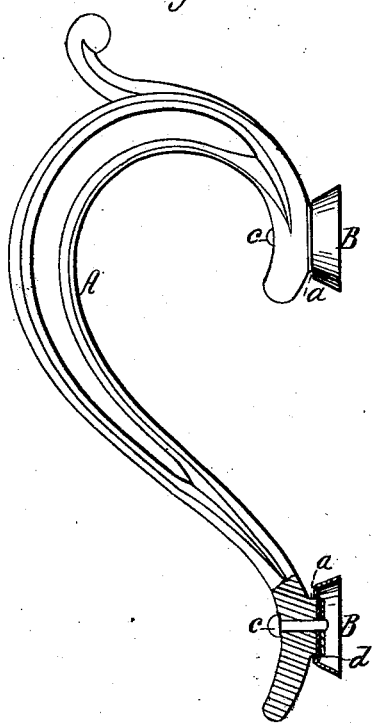

Figure 1 is an elevation of a handle of my invention, showing the parts by which it is to be secured to the vessel, and Figure 2 is a side elevation of the same, partly in section.

A designates a cast-metal handle of any pleasing design, and which is provided with two plain surfaces, $a\ a$, slightly projecting from the handle.

B B designate connections of cup-shaped form, which are swaged or struck up from sheet metal.

The bottom or back sides of the connections B B have a plain surface of a size corresponding with the plain surfaces $a\ a$.

A rivet, $c$, is passed through the handle A at each end, and projects from the center of the plain surfaces $a\ a$.

The cup-shaped connection B is then placed on the surface $a$ with the rivet $c$ passing through the bottom of B, when a washer, $d$, is placed on the end of rivet $c$, which rivet is then upset, thus securing the connection B firmly to the handle A.

The handle is designed to be secured to the vessel by soldering the connections B B thereto.

If very thick metal is employed for the construction of the connections B B, the washer $d$ may be dispensed with. The rivet $c$ may be cast into the handle, or inserted through a drilled hole, or, if the metal composing the handle is sufficiently malleable, a tenon or projection may be cast upon the handle, as a substitute for the rivet.

In ordinary cast-metal tea-pot handles the connections consist of sheet-metal tubes, one end of which tubes are slipped upon projections on the handle, and secured thereto by solder. This necessitates the labor of removing the scale of the iron from the projections previous to soldering.

By use it is found that the solid cast-iron handle and sheet-metal tubes thus soldered together are more liable to unsolder than are the tubes and the vessel to which they are secured.

By my invention the connections are secured to the handle by less labor, and therefore at a reduced cost as compared with the ordinary handle. The connections are also secured in such manner as to prevent any accidental disconnection of the handle and connections by unsoldering, or otherwise, thus producing a better article at a less cost.

I claim as my invention—

As a new article of manufacture, the herein-described handle for tea-pots and similar vessels, consisting of the cast-metal handle A, and the swaged or struck-up cup-shaped connections B B, secured to said handle by rivets, substantially as described.

LUCAS C. CLARK.

Witnesses:
JAMES GODDARD,
H. R. BRADLEY.